(12) United States Patent
Lu et al.

(10) Patent No.: US 12,259,136 B2
(45) Date of Patent: Mar. 25, 2025

(54) SYSTEMS AND METHODS FOR OPERATION OF A FLEXIBLE FUEL COMBUSTOR

(71) Applicant: 8 Rivers Capital, LLC, Durham, NC (US)

(72) Inventors: Xijia Lu, Durham, NC (US); Jeremy Eron Fetvedt, Raleigh, NC (US); Peter Michael McGroddy, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 18/231,384

(22) Filed: Aug. 8, 2023

(65) Prior Publication Data

US 2023/0383950 A1 Nov. 30, 2023

Related U.S. Application Data

(63) Continuation of application No. 17/525,314, filed on Nov. 12, 2021, now Pat. No. 11,828,468, which is a
(Continued)

(51) Int. Cl.
*F02C 3/30* (2006.01)
*F02C 3/20* (2006.01)
(Continued)

(52) U.S. Cl.
CPC ............ *F23R 3/36* (2013.01); *F02C 3/20* (2013.01); *F02C 3/30* (2013.01); *F02C 9/28* (2013.01);
(Continued)

(58) Field of Classification Search
CPC ...... F02C 9/26; F02C 9/28; F02C 3/30; F23R 3/36
See application file for complete search history.

(56) References Cited

U.S. PATENT DOCUMENTS 2,658,332 A 11/1953 Nicholson
2,660,521 A 11/1953 Teichman
(Continued)

FOREIGN PATENT DOCUMENTS

CN 102305109 1/2012
CN 104031707 9/2014
(Continued)

OTHER PUBLICATIONS

Biofuels, "What is Syngas" 2010, pp. 1-2.
(Continued)

*Primary Examiner* — Thuyhang N Nguyen
(74) *Attorney, Agent, or Firm* — Womble Bond Dickinson (US) LLP (57) ABSTRACT

The present disclosure relates to systems and methods that are useful for controlling one or more aspects of a power production plant. More particularly, the disclosure relates to power production plants and methods of carrying out a power production method utilizing different fuel chemistries. Combustion of the different fuel mixtures can be controlled so that a defined set of combustion characteristics remains substantially constant across a range of different fuel chemistries.

20 Claims, 2 Drawing Sheets

Related U.S. Application Data continuation of application No. 15/869,552, filed on Jan. 12, 2018, now Pat. No. 11,199,327.

(60) Provisional application No. 62/467,924, filed on Mar. 7, 2017.

(51) Int. Cl.

| | |
|---|---|
| *F02C 9/28* | (2006.01) |
| *F02C 9/40* | (2006.01) |
| *F23C 1/00* | (2006.01) |
| *F23D 14/32* | (2006.01) |
| *F23K 5/00* | (2006.01) |
| *F23L 7/00* | (2006.01) |
| *F23N 1/00* | (2006.01) |
| *F23N 1/02* | (2006.01) |
| *F23N 3/00* | (2006.01) |
| *F23N 5/24* | (2006.01) |
| *F23N 5/26* | (2006.01) |
| *F23R 3/36* | (2006.01) |

(52) U.S. Cl.
CPC .............. *F02C 9/40* (2013.01); *F23C 1/00* (2013.01); *F23D 14/32* (2013.01); *F23K 5/007* (2013.01); *F23L 7/007* (2013.01); *F23N 1/00* (2013.01); *F23N 1/02* (2013.01); *F23N 3/00* (2013.01); *F23N 5/24* (2013.01); *F23N 5/26* (2013.01); *F05D 2270/303* (2013.01); *F23C 2700/04* (2013.01); *F23C 2900/99011* (2013.01); *F23K 2900/05004* (2013.01); *F23L 2900/07001* (2013.01); *F23L 2900/07003* (2013.01); *F23L 2900/07005* (2013.01); *F23L 2900/07006* (2013.01); *F23L 2900/07007* (2013.01); *F23N 2221/06* (2020.01); *F23N 2221/08* (2020.01); *F23N 2237/08* (2020.01); *F23N 2241/20* (2020.01); *F23R 2900/00002* (2013.01); *Y02E 20/32* (2013.01); *Y02E 20/34* (2013.01)

(56) References Cited

U.S. PATENT DOCUMENTS

| | | | |
|---|---|---|---|
| 2,861,423 A | 11/1958 | Jerie et al. | |
| 3,399,022 A | 8/1968 | Bailey | |
| 3,420,631 A | 1/1969 | Boyd | |
| 3,623,711 A | 11/1971 | Thorstenson | |
| 3,793,861 A | 2/1974 | Burkhard et al. | |
| 3,857,921 A | 12/1974 | Tamura et al. | |
| 3,921,544 A | 11/1975 | Reese | |
| 3,971,211 A | 7/1976 | Wethe et al. | |
| 3,976,443 A | 8/1976 | Paull et al. | |
| 4,268,765 A | 5/1981 | Hoover | |
| 4,386,941 A | 6/1983 | Crouch et al. | |
| 4,422,925 A | 12/1983 | Williams et al. | |
| 4,572,082 A | 2/1986 | Ueda et al. | |
| 4,673,348 A | 6/1987 | Riley et al. | |
| 4,775,314 A | 10/1988 | Sternling | |
| 4,873,930 A | 10/1989 | Egense et al. | |
| 4,895,710 A | 1/1990 | Hartmann et al. | |
| 4,986,838 A | 1/1991 | Johnsgard | |
| 5,078,760 A | 1/1992 | Haldipur et al. | |
| 5,097,660 A | 3/1992 | Shekleton | |
| 5,116,394 A | 5/1992 | Garkawe | |
| 5,167,932 A | 12/1992 | Ruottu | |
| 5,408,825 A | 4/1995 | Foss et al. | |
| 5,457,953 A | 10/1995 | Etheridge | |
| 5,476,375 A | 12/1995 | Khinkis et al. | |
| 5,597,540 A | 1/1997 | Akita et al. | |
| 5,709,077 A | 1/1998 | Beichel | |
| 5,858,065 A | 1/1999 | Li et al. | |
| 6,151,887 A | 11/2000 | Haidn et al. | |
| 6,234,787 B1 | 5/2001 | Endoh et al. | |
| RE37,300 E | 7/2001 | Nagato et al. | |
| 6,408,629 B1 | 6/2002 | Harris et al. | |
| 6,436,337 B1 | 8/2002 | Gross | |
| 6,497,118 B1 | 12/2002 | Schermerhorn | |
| 6,596,220 B2 | 7/2003 | Gross | |
| 6,606,851 B1 | 8/2003 | Herdy, Jr. et al. | |
| 6,617,003 B1 | 9/2003 | Lee et al. | |
| 6,725,665 B2 | 4/2004 | Tuschy et al. | |
| 6,843,830 B2 | 1/2005 | Sherer | |
| 6,862,877 B1 | 3/2005 | James | |
| 6,896,707 B2 | 5/2005 | O'Rear et al. | |
| 7,028,478 B2 | 4/2006 | Prentice, III | |
| 7,089,745 B2 | 8/2006 | Roby et al. | |
| 7,147,461 B2 | 12/2006 | Neary | |
| 7,186,091 B2 | 3/2007 | Lee et al. | |
| 7,260,935 B2 | 8/2007 | Colibaba-Evulet et al. | |
| 7,334,396 B2 | 2/2008 | Erickson et al. | |
| 7,380,402 B2 | 6/2008 | Rebhan et al. | |
| 7,516,620 B2 | 4/2009 | Patrick et al. | |
| 7,700,049 B2 | 4/2010 | Clark et al. | |
| 7,736,599 B2 | 6/2010 | Chiu et al. | |
| 7,955,406 B2 | 6/2011 | Smith | |
| 8,671,658 B2 | 3/2014 | Prabhu | |
| 8,899,969 B2 | 12/2014 | Gard et al. | |
| 9,127,596 B2* | 9/2015 | Dooley .................... | F02C 9/40 |
| 9,581,081 B2 | 2/2017 | Biyani et al. | |
| 9,677,764 B2 | 6/2017 | Knapp et al. | |
| 10,161,312 B2 | 12/2018 | Huntington et al. | |
| 2004/0142294 A1 | 7/2004 | Niass et al. | |
| 2004/0219079 A1 | 11/2004 | Hagen et al. | |
| 2005/0135984 A1 | 6/2005 | Ferron et al. | |
| 2005/0225424 A1 | 10/2005 | Tsukada | |
| 2006/0037323 A1 | 2/2006 | Reynolds et al. | |
| 2006/0080966 A1 | 4/2006 | Widener | |
| 2007/0101722 A1 | 5/2007 | Hoffmann | |
| 2007/0234735 A1 | 10/2007 | Mosbacher et al. | |
| 2007/0240425 A1 | 10/2007 | Malavasi et al. | |
| 2007/0274876 A1 | 11/2007 | Chiu et al. | |
| 2007/0277528 A1* | 12/2007 | Homitz .................... | F23D 14/08 |
| | | | 60/737 |
| 2008/0250772 A1 | 10/2008 | Becker et al. | |
| 2009/0019767 A1* | 1/2009 | Abughazaleh ............ | C10J 3/485 |
| | | | 48/205 |
| 2009/0188256 A1 | 7/2009 | Woodcock et al. | |
| 2009/0255450 A1 | 10/2009 | Stone et al. | |
| 2010/0050517 A1 | 3/2010 | Tsilevich | |
| 2010/0083882 A1 | 4/2010 | Widener et al. | |
| 2010/0092280 A1 | 4/2010 | Draper | |
| 2010/0107642 A1 | 5/2010 | Bhaisora et al. | |
| 2010/0162678 A1* | 7/2010 | Annigeri .................... | F02C 3/22 |
| | | | 60/39.463 |
| 2010/0242483 A1 | 9/2010 | Snyder et al. | |
| 2010/0300063 A1 | 12/2010 | Palmer et al. | |
| 2010/0300110 A1 | 12/2010 | Kraemer et al. | |
| 2010/0307431 A1 | 12/2010 | Buchanan | |
| 2011/0056373 A1 | 3/2011 | Baxter | |
| 2011/0056737 A1 | 3/2011 | Hagiwara et al. | |
| 2011/0067379 A1 | 3/2011 | Khan et al. | |
| 2011/0296844 A1* | 12/2011 | Widener .................... | F02C 7/22 |
| | | | 60/734 |
| 2011/0302927 A1* | 12/2011 | Ajami ....................... | F02C 7/26 |
| | | | 60/776 |
| 2012/0131925 A1* | 5/2012 | Mittricker ................. | F23R 3/06 |
| | | | 60/39.23 |
| 2012/0282558 A1 | 11/2012 | Kraemer et al. | |
| 2013/0219910 A1 | 8/2013 | Botarelli | |
| 2013/0269360 A1 | 10/2013 | Wichmann et al. | |
| 2014/0000274 A1 | 1/2014 | Srinivasan et al. | |
| 2015/0020497 A1 | 1/2015 | Yasunori et al. | |
| 2015/0027099 A1 | 1/2015 | Yasunori et al. | |
| 2015/0033749 A1 | 2/2015 | Slobodyanskiy et al. | |
| 2015/0040571 A1* | 2/2015 | Coomar .................... | F02C 9/28 |
| | | | 60/734 |
| 2015/0059352 A1 | 3/2015 | Myers | |
| 2015/0292402 A1 | 10/2015 | Razak | |
| 2016/0134291 A1 | 5/2016 | Fetvedt et al. | |
| 2016/0363009 A1 | 12/2016 | Fetvedt et al. | |

(56) References Cited

U.S. PATENT DOCUMENTS

| | | | |
|---|---|---|---|
| 2017/0067373 A1 | 3/2017 | Allam et al. | |
| 2017/0248083 A1 | 8/2017 | Fetvedt et al. | |
| 2018/0142627 A1* | 5/2018 | Harper | F02C 9/26 |

FOREIGN PATENT DOCUMENTS

| | | |
|---|---|---|
| DE | 35 14974 | 10/1986 |
| DE | 3519159 | 12/1986 |
| DE | 4443077 | 6/1996 |
| DE | 4244921 C2 | 2/1998 |
| DE | 19731209 | 1/1999 |
| EP | 0 564 184 | 6/1993 |
| EP | 1 195 559 A2 | 4/2002 |
| EP | 2014 984 | 1/2009 |
| JP | S6373006 | 4/1988 |
| JP | H01111108 | 4/1989 |
| JP | H09-145057 | 6/1997 |
| JP | H1054534 | 2/1998 |
| JP | 10-121912 A | 5/1998 |
| JP | H10141662 | 5/1998 |
| JP | H11336528 | 12/1999 |
| JP | 200444845 | 2/2004 |
| JP | 201025538 | 2/2010 |
| RU | 2138661 C1 | 9/1999 |
| SU | 373488 | 5/1973 |
| TW | 200623226 | 7/2006 |
| WO | WO 98/21522 | 5/1998 |
| WO | WO 2005/114050 | 12/2005 |
| WO | WO 2008/057685 | 5/2008 |
| WO | WO 2009/007356 | 1/2009 |
| WO | WO 2014/151656 | 9/2014 |

OTHER PUBLICATIONS

Jiang et al., "Experimental Investigation of Flow Resistance and Convection Heat Transfer of CO2 at Supercritical Pressures in a Vertical Porous Tube," *The Journal of Supercritical Fluids*, 2006, vol. 38, pp. 339-346.

Sahoo "Effect of Load Level on the Performance of a Dual Fuel Compression Ignition Engine Operating on Syngas Fuels," *Journal of Engineering for Gas Turbines and Power*, Dec. 2011, vol. 133, pp. 122802-1-122802-12.

Sater et al., "A CFD Simulation of Coal Syngas Oxy-Combustion in a High-Pressure Supercritical CO2 Environment," *Proceedings of ASME Turbo Expo 2017: Turbomachinery Technical Conference and Exposition*, Jun. 26-30, 2017, Charlotte, NC, USA, pp. 1-12.

Stoichiometry 2020, pp. 1-3.

\* cited by examiner

SYSTEMS AND METHODS FOR OPERATION OF A FLEXIBLE FUEL COMBUSTOR

RELATED APPLICATIONS

The present application is a continuation of U.S. patent application Ser. No. 17/525,314, filed Nov. 12, 2021, which is a continuation of U.S. patent application Ser. No. 15/869,552, filed Jan. 12, 2018, which claims priority to U.S. Provisional Patent Application No. 62/467,924, filed Mar. 7, 2017, the disclosures of which are incorporated herein by reference.

FIELD OF THE DISCLOSURE

The presently disclosed subject matter relates to systems and methods for operation of one or more components of a power generating system. More particularly, the present disclosure relates to operation of a combustor so that different types of fuels may be combusted in the same combustor under one or more sets of conditions.

BACKGROUND

As the demand for electrical power production increases there is a continuing need for power production plants to meet such needs. Because of market demands, it is desirable for such power production to be achieved with the greatest possible efficiency; however, growing requirements for carbon capture have required technological advances. For example, U.S. Pat. No. 8,596,075 to Allam et al., the disclosure of which is incorporated herein by reference, provides for desirable efficiencies in oxy-fuel combustion systems utilizing a recycle $CO_2$ stream wherein the $CO_2$ is captured as a relatively pure stream at high pressure. Although many known power producing systems are configured for combustion of a specific type of fuel (e.g., natural gas versus syngas), power producing facilities can be even further improved by allowing for operation with different types or sources of fuels without requiring significant changes to the necessary components of the power producing facility, such as the combustor that is used. Accordingly, there remains a need in the art for further means for operation of a power production plant such that different fuels may be utilized without significant changes in the underlying equipment used to carry out the power production process.

SUMMARY OF THE DISCLOSURE

The present disclosure provides systems and methods for power production. More particularly, the present disclosure provides operating conditions whereby a power production system can accommodate different fuels without a requirement for significant modifications to a combustor that is utilized in carrying out the power production process. This can provide a significant advantage since different fuels can be switched as needed without the requirement for associated swapping of parts for the power production system.

The properties (including combustion properties) of different fuel sources that may be used in a power production method according to the present disclosure can differ significantly. For example, the fuel properties of natural gas are significantly different from the fuel properties of a synthesis gas ("syngas"). Likewise, the properties of both natural gas and syngas can differ significantly from the properties of substantially pure methane. As one example, the heating value of natural gas is approximately five times higher than the heating value of dried syngas taken from a coal gasifier. As another example, hydrogen also has significantly different properties when compared to natural gas, substantially pure methane, and/or syngas. Therefore, for a given mass of each fuel, properties such as flame characteristics, thermal energy delivered to the downstream system temperature profiles, exhaust gas conditions, and exhaust gas compositions will vary significantly. A combustor for a power production facility must be designed as a fixed chamber that is customized to the properties of the fuel that will be combusted therein in order to optimize combustor performance. As such, only a narrow range of fuel mixtures can be matched with the combustor design conditions (and therefore flame and combustor outlet conditions) and thus be tolerable for use in the combustor. Further, mixtures within this range may still cause perturbations in combustor or flame behavior that must be tightly controlled.

In one or more embodiments, the present disclosure provides systems and methods whereby a power production plant can be closely controlled in relation to combustion properties even when utilizing different fuels types and/or fuel mixtures. In some embodiments, the present invention thus can relate to a power production plant comprising: a combustor configured to receive a fuel, an oxidant, and a diluent, the combustor being adapted to combust different fuel compositions; a turbine; a generator; a supply system for the fuel; a supply system for the oxidant; and a control system configured to adjust one or more parameters related to one or more of the fuel, the oxidant, and the diluent such that combustion characteristics are maintained within a defined set of operation parameters for all of the different fuel compositions. In the present systems, the control system in particular can be critical to achieving the necessary system performance.

In one or more embodiments, the present invention further can relate to a method of power production, the method comprising: delivering an oxidant to a combustor; delivering a diluent to the combustor; delivering a fuel to the combustor, the fuel being a mixture of materials that varies over the course of the power production method; passing a combustion product stream from the combustor through a turbine to generate power; and controlling one or more parameters related to one or more of the fuel, the oxidant, and the diluent such that combustion characteristics are maintained within a defined set of operation parameters for different mixtures of materials forming the fuel.

In some embodiments, control methods can include blending of two different fuels to normalize combustion of one of the fuels that may be subject to fluctuation of composition. Such blending likewise can be utilized to provide for a smooth transition between the use of the two different fuels using the same combustor. As a non-limiting example for normalizing combustion of a fluctuating syngas composition, a diluted natural gas fuel or a substantially pure $CO_2$ stream can be utilized as a tuning factor to adjust the characteristics of the syngas fuel so it is normalized to be close to the intended fuel characteristic design point by blending the diluted natural gas fuel or the $CO_2$ diluent stream with the syngas fuel at a proper mixing ratio. As noted, this can be particularly useful when the syngas coming into the combustor experiences fluctuation or the syngas composition significantly deviates from the design point because of being derived from different gasification systems. In some embodiments, it can be particularly useful to maintain the concentration of the diluent entering the combustor to be higher than the concentration of oxygen and/or fuel entering the combustion chamber. Having a diluent flow than is significantly larger than the oxygen flow and/or the fuel flow into the combustor can provide for a very stable combustion environment while simultaneously allowing for perturbations and/or variations of the fuel chemistry.

Additionally, combustor outlet conditions can be maintained regardless of the type of fuel being used. This can be achieved, for example, by modulation of the flow rate of the diluent injection section downstream of the diffusion flame zone section. Outlet temperature can be maintained by adjusting the mass flow rate of the diluent injection at this section. The mass flow rate of the diluent in this section will also be significantly greater than the combined flowrate of the fuel and oxidant. Moreover, by keeping the diluent flow ratio large relative to the oxygen flow and/or the fuel flow into the combustor, the combustor exit composition can be substantially stable across a variety of fuel chemistries.

In some embodiments, the present disclosure specifically can provide a method for normalizing combustion in a power production process. In exemplary embodiments, the method can comprise: providing a variable fuel to a combustor, the variable fuel having a composition that varies during operation of the power production process; combusting the variable fuel in the combustor with an oxidant to provide a combustor exhaust stream; passing the combustor exhaust stream through a turbine to generate power; and implementing at least one control function such that at least one combustion property (e.g., one or both of a temperature and a mass flow of the combustor exhaust stream exiting the combustor) varies by no greater than 10% as the composition of the variable fuel varies during operation of the power production process. In further embodiments, the method may be further defined in relation to one or more of the following statements, which may be combined in any number and order.

The variable fuel can be a syngas, and a ratio of carbon monoxide to hydrogen in the syngas can vary during operation of the power production process.

The variable fuel can be a mixture of methane, carbon monoxide, and hydrogen, and a ratio between the methane, carbon monoxide, and hydrogen can vary during operation of the power production process.

The oxidant can be a mixture of oxygen and a diluent (e.g., an inert gas, carbon dioxide, or water).

The oxidant can include about 5% to about 50% by mass oxygen, with the remaining portion of the oxidant being the diluent.

The oxidant can include about 15% to about 30% by mass oxygen, with the remaining portion of the oxidant being the diluent.

The at least one control function can include varying a ratio of the oxygen to the carbon dioxide in the oxidant as the composition of the variable fuel varies during operation of the power production process.

The at least one control function can include varying one or more of a temperature of the oxidant input to the combustor, a temperature of the variable fuel input to the combustor, a flow rate of the oxidant input to the combustor, and a flow rate of the variable fuel input to the combustor as the composition of the variable fuel varies during operation of the power production process.

The variable fuel provided to the combustor can be blended with a normalizing fuel having a substantially constant composition.

The normalizing fuel can be natural gas or substantially pure methane.

The at least one control function can include varying a ratio of the normalizing fuel to the variable fuel that is combusted in the combustor.

The variable fuel provided to the combustor can be blended with a diluent.

The diluent can be an inert gas.

The diluent can be carbon dioxide.

The diluent can be water.

The at least one control function can include varying a ratio of the diluent to the variable fuel that is combusted in the combustor.

The combustor can be configured with a combustion zone and a dilution zone, wherein the combustion zone can be upstream of the dilution zone, and the dilution zone can be downstream of the combustion zone, and a diluent can be injected into the combustor in the dilution zone.

A ratio of the length of the combustion zone to a length of the dilution zone can be about 0.1 to about 10, about 0.2 to about 5, or about 0.25 to 1.0.

The at least one control function can include: controlling a mass flow rate of the diluent injected into the combustor in the dilution zone to be greater than a mass flow rate of the variable fuel provided to the combustor; controlling a mass flow rate of the diluent injected into the combustor in the dilution zone to be greater than a mass flow rate of the oxidant provided to the combustor; or controlling a mass flow rate of the diluent injected into the combustor in the dilution zone to be greater than a mass flow rate of both of the variable fuel provided to the combustor and the oxidant provided to the combustor.

The at least one control function can include varying one or more of a temperature, a flow rate, and a chemistry of the diluent injected into the combustor in the dilution zone as the composition of the variable fuel varies during operation of the power production process.

The diluent can be an inert gas.

The diluent can be carbon dioxide.

The diluent can be water.

In some embodiments, the present disclosure further can relate to a power production plant. For example, such power production plant can comprise: a combustor configured to receive an oxidant, a diluent, and a variable fuel having a composition that varies during operation of the power production plant, the combustor being configured to output a combustor exhaust stream; a turbine; a generator; a supply system for the variable fuel; a supply system for the oxidant; and a control system configured to adjust one or more parameters related to one or more of the variable fuel, the oxidant, and the diluent such that at least one combustion property (e.g., one or both of a temperature and a mass flow of the combustor exhaust stream exiting the combustor) varies by no greater than 10% as the composition of the variable fuel varies during operation of the power production plant.

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods adapted for controlling the operation of a power production plant. As such, the present disclosure further relates to power production plants including a variety of elements, including such control functions. Non-limiting examples of elements that may be included in a power production plant (and method of operation thereof) according to the present disclosure are described in U.S. Pat. Nos. 8,596,075, 8,776,532, 8,869,889, 8,959,887, 8,986,002, 9,062,608, 9,068,743, 9,410,481, 9,416,728, U.S. Pat. Pub. No. 2010/0300063, U.S. Pat. Pub. No. 2012/0067054, U.S. Pat. Pub. No. 2012/0237881, and U.S. Pat. Pub. No. 2013/0213049, the disclosures of which are incorporated herein by reference.

Figure 1:
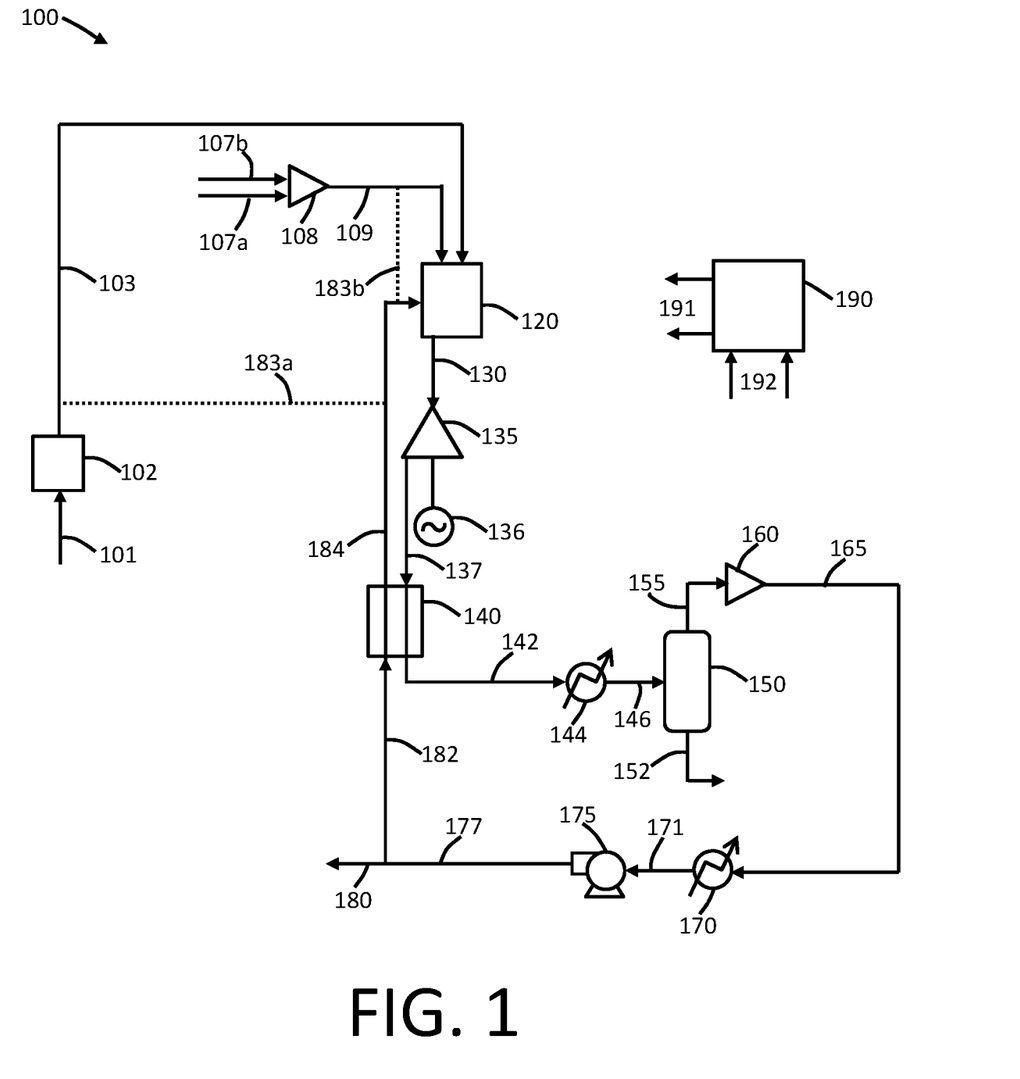
FIG. 1 is an illustration of a power production plant and associated method of operation thereof according to embodiments of the present disclosure.

An exemplary power production plant 100 for carrying out a power production process according to the present disclosure is illustrated in FIG. 1. As seen therein, a combustor 120 is configured for receipt of one or more fuels, an oxidant, and a diluent. More particularly, an air stream 101 can pass through an air separation unit 102 to provide an oxidant stream 103 that passes to the combustor 120. The air separation unit 102 can include the necessary compression equipment to provide the oxidant at the desired pressure, or a separate compressor may be provided in-line between the air separation unit 102 and the combustor 120. In such instance, a first portion 183a of the recycled carbon dioxide stream 184 can be mixed with the oxidant stream 103 prior to compression. A first fuel stream 107a and an optional second fuel stream 107b can be passed through a compressor 108 to form a compressed fuel stream 109 that is passed to the combustor 120. A recycled carbon dioxide stream 184 is likewise passed to the combustor 120 and can function as a diluent stream. In some embodiments, a first portion 183a of the recycled carbon dioxide stream 184 can be withdrawn and combined with the oxidant stream 103 to form a diluted oxidant stream having an $O_2/CO_2$ ratio as otherwise described herein. Likewise, in some embodiments, a second portion 183b of the recycled carbon dioxide stream 184 can be withdrawn and combined with the fuel stream 109 to form a diluted fuel stream having a fuel/$CO_2$ ratio as otherwise described herein. Although a single compressor 108 is illustrated, it is understood that a plurality of compressors may be used, and a separate compressor may be used for each of the fuel streams that is used. Likewise, although the second portion 183b of the recycled carbon dioxide stream 184 is shown as being added to the fuel stream 109, it is understood that the diluent may be added to one or both of the fuel streams prior to compression. Additionally, the diluent for use with the fuel and the oxidant is not limited to the recycled carbon dioxide stream 184. Rather, the diluent may be taken from any one or more of streams 155, 165, 171, 177, 182, and 184.

A combustor exhaust stream 130 is passed through a turbine 135 where it is expanded to produce power in generator 136. A turbine exhaust stream 137 is passed through a heat exchanger 140 where it is cooled to form stream 142, which is further cooled to near ambient temperature in a cooler 144. The cooled turbine exhaust stream 146 is then processed in a water separator 150 to provide a water stream 152 and a substantially pure carbon dioxide stream 155, which is compressed in a compressor 160 to form an intermediate compressed stream 165. The intermediate compressed stream 165 is cooled in a cooler 170 to increase the density of the carbon dioxide and form an increased density carbon dioxide stream 171, which is pumped in pump 175 to a high pressure for input to the combustor 120. A carbon dioxide product stream 180 can be withdrawn from the high pressure carbon dioxide stream 177 to leave a carbon dioxide recycle stream 182 that is passed back though the heat exchanger 140 to be heated against the turbine exhaust stream 137. The heated recycle carbon dioxide stream 184 is then routed back to the combustor 120 for use as a diluent.

A power production plant according to the present disclosure particularly can be configured for specific control of the combustion step of the power production process. As such, a controller 190 can be included in the power production plant 100, and the controller can be configured to provide one or more outputs 191 that implement one or more control functions that adjust operation of the combustor 120 to accommodate a variable fuel. The outputs 191, for example, may provide instructions to one or more components of the power production plant 100, such as various valves, pumps, or the like that can be effective to adjust flow of one or more streams. Likewise, the controller 190 may receive one or more inputs 192, such as from a sensor, that can provide data specifically related the variable chemistry of the variable fuel that can be used to determine when further control functions as described herein should be implemented to adjust one or more combustion properties and maintain a substantially consistent combustion profile.

As used herein, a "variable fuel" is understood to mean a fuel having a composition that varies during operation of the power production process. Because the present disclosure utilizes a variable fuel, it is not necessary to maintain a substantially constant fuel composition during operation. Rather, the composition of the fuel can change without substantially interruption to the operation of the power production plant. For example, where the variable fuel is a syngas, a ratio of carbon monoxide to hydrogen in the syngas can vary. For example, the carbon monoxide to hydrogen ratio in the syngas can vary from about 0.8 to about 3.0, from about 0.85 to about 2.8, or about 0.9 to about 2.6 during operation of the power production process without requiring significant interruption of the process and without requiring changes in combustion equipment. As another non-limiting example, the variable fuel can be a mixture of methane, carbon monoxide, and hydrogen, and a ratio between the methane, carbon monoxide, and hydrogen can vary during operation of the power production process without requiring significant interruption of the process and without requiring changes in combustion equipment. Likewise, the presently disclosed configurations allow for significant changes in the nature of the fuel. For example, the variable fuel can vary in macro composition (i.e., the chemical makeup of the material) as opposed to micro composition (i.e., the ratio of components of the fuel). A variance in the macro composition can comprise changing between utilizing syngas and instead utilizing natural gas or changing between utilizing natural gas and instead utilizing hydrogen.

The advantages of the present disclosure can be realized through the implementation of defined controls over the operation of the combustor. As noted above, a power production process can comprise combusting a variable fuel in a combustor in the presence of a content of a diluent (preferably $CO_2$) and a content of an oxidant (preferably substantially pure $O_2$). As such, all three of the variable fuel, the diluent, and the oxidant will be input to the combustor. Preferably, the variable fuel and the oxidant are input in a substantially stoichiometric ratio (although an excess of oxidant in the range of about 0.1% to about 5%, about 0.25% to about 4%, about 0.5% to about 3%, or about 1% to about 2% molar can be provided to ensure substantially complete combustion of all fuel input to the combustor). Any one or more of the variable fuel, the diluent, and the oxidant can be input to the combustor in a substantially pure state (i.e., not mixed with a further material). Alternatively, the variable fuel, the diluent, and/or the oxidant can be input to the combustor in any combinations (i.e., a mixture of the variable fuel and the diluent and/or a mixture of the diluent and the oxidant). One or more characteristics of the combustion can be controlled through varying one or more characteristics of the streams being input to the combustor. Thus, the variable fuel that is subject to having varying fuel chemistries can be utilized without requirement of significant changes to the system components despite the fuel chemistry changes.

Use of a diluent particularly can be beneficial for controlling various parameters of the combustion process. A diluent may be mixed with a variable fuel and/or a normalizing fuel, and/or an oxidant, and/or a combustion product. Substantially pure carbon dioxide particularly may be used as a diluent. An inert gas may be used as a diluent. Water (e.g., steam) may be used as a diluent. The diluent may be a mixture of materials (e.g., carbon dioxide and water). The same diluent may be used for mixture with any of the variable fuel, the normalizing fuel, the oxidant, and the combustion product. Alternatively, two or more different diluents may be used for mixture with any of the noted streams.

In one or more embodiments, any one or more of the pressure of the combustor exhaust stream, the temperature of the combustor exhaust stream, and the chemistry of the combustor exhaust stream can be controlled to be maintained within defined parameters without the need for re-configurations of the combustor despite changes in the chemistry of the variable fuel. For example, the combustor exhaust stream can have a pressure in the range of about 150 bar to about 500 bar, about 200 bar to about 400 bar, or about 250 bar to about 350 bar. The temperature of the combustor exhaust stream can be in the range of about 700° C. to about 1500° C., about 900° C. to about 1400° C., or about 1000° C. to about 1300° C.

In some embodiments, the present disclosure thus can provide methods for normalizing combustion in a power production process utilizing a variable fuel. For example, such methods can comprise providing the variable fuel to the combustor, combusting the variable fuel in the combustor with an oxidant to provide a combustor exhaust stream, passing the combustor exhaust stream through a turbine to generate power, and implementing at least one control function such that one or more characteristics of the combustor exhaust stream exiting the combustor remains controlled within a defined range despite the variance in the chemistry of the fuel during operation of the power production process. For example, in some embodiments, the control function can be configured such that a temperature of the combustor exhaust stream exiting the combustor varies by no greater than 40%, no greater than 20%, no greater than 15%, no greater than 10%, no greater than 8%, no greater than 6%, no greater than 4%, no greater than 2%, or no greater than 1% as the composition of the variable fuel varies during operation of the power production process.

In some embodiments, the diluent can be added to the variable fuel and/or oxidant stream to control other parameters which are important to the operation of the combustor. As a non-limiting example, the jet speed of the variable fuel passing through the fuel injection nozzles can be modified by changing the rate of addition of the diluent to the fuel stream.

Figure 2:
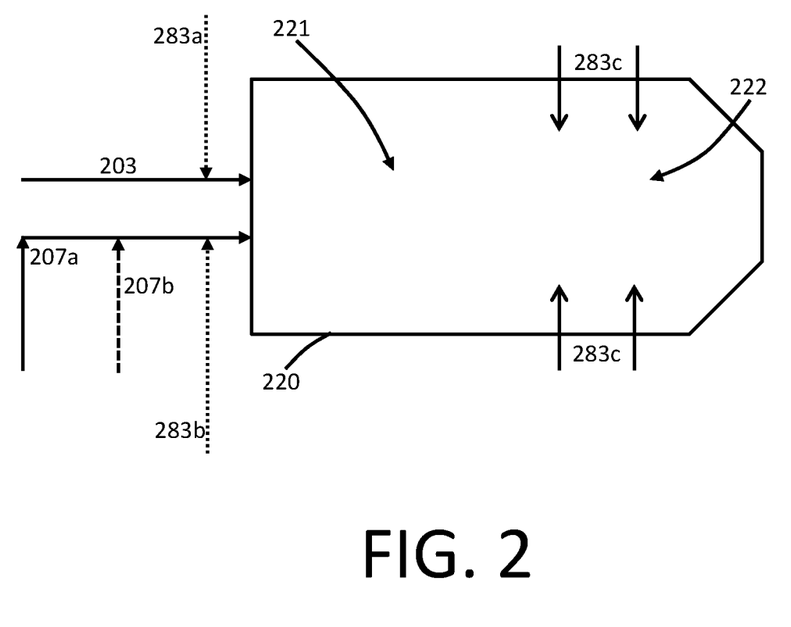
FIG. 2 is schematic illustration of a combustor suitable for use according to embodiments of the present disclosure

The ability to control combustion and enable the utilization of a variable fuel is further evident in relation to the combustor illustrated in FIG. 2. In one or more embodiments, combustion can be normalized despite variances in combustion characteristics arising from the differing chemistries of the variable fuel. This can be achieved, for example, by adjusting one or more characteristics of one or more of the streams input to the combustor. As such, a single combustor can be used for combustion of a variety of different syngas compositions as well as combustion of a variety of different gaseous fuels, such as natural gas, substantially pure methane, hydrogen, or the like. Normalization of combustion can be quantified, for example, in terms of any one or more of fuel heating value, flame temperature, combustion pressure, combustor exit temperature, mass flow out of the combustor, turbine inlet flow chemistry, turbine speed, and other such variables. In some embodiments, for example, the actual heating value achieved in the combustor can differ from the theoretical heating value based on the given fuel chemistry due to a normalizing function as otherwise described herein. In exemplary embodiments, a defined heating value range can be set for combustor operation, and the defined heating value range can be maintained even though the actual heating value of the variable fuel may increase above the defined heating value range and/or the actual heating value of the variable fuel may decrease below the define heating value range during the course of operation of the power production process. Specifically, the normalizing function can be effective to maintain the heating value in the combustor within 40%, within 20%, within 15%, within 10%, within 5%, within 2%, or within 1% of a predetermined value despite changes in the fuel chemistry of the variable fuel. In other words, the heating value of the combusted fuel in the combustor may vary by no more than the above-noted values during operation of the power production process In some embodiments, the flame temperature in the combustor and/or the combustor exhaust stream exit temperature can be maintained within a defined range (which can be less than what would be expected based upon the given fuel chemistry or greater than what would be expected based upon the given fuel chemistry) by implementing one or more of the normalizing functions described herein. In exemplary embodiments, a defined flame temperature in the combustor and/or a defined exit temperature for the combustor exhaust stream can be set for combustor operation, and the defined temperature can be maintained even though changes in the fuel chemistry of the variable fuel would be expected to significantly change the temperature. Specifically, the normalizing function can be effective to maintain the defined flame temperature in the combustor and/or the defined exit temperature for the combustor exhaust stream within 40%, within 20%, within 15%, within 10%, within 5%, within 2%, or within 1% of the defined temperature. In other words, the flame temperature in the combustor and/or the exit temperature for the combustor exhaust stream may vary by no more than the above-noted values during operation of the power production process.

In some embodiments, the mass flow of the combustor exhaust stream exiting the combustor can be maintained within a defined range by implementing one or more of the normalizing functions described herein. In exemplary embodiments, a mass flow rate of the combustor exhaust stream exiting the combustor (or a mass flow range) can be set for combustor operation, and the defined mass flow rate (or mass flow range) can be maintained even though changes in the fuel chemistry of the variable fuel would be expected to significantly change the mass flow. Specifically, the normalizing function can be effective to maintain the defined mass flow of the exhaust stream exiting the combustor within 40%, within 20%, within 15%, within 10%, within 5%, within 2%, or within 1% of the defined mass flow. In other words, the mass flow for the combustor exhaust stream exiting the combustor may vary by no more than the above-noted values during operation of the power production process.

In one or more embodiments, the varying chemistries of the variable fuel 207a being input to the combustor 220 can be normalized by being blended with a diluent 283b which, in preferred embodiments, can comprise substantially pure carbon dioxide. The diluent 283b can then controlled as a normalizing function that can be adjusted in one or more manners as the fuel chemistry of the variable fuel 207a changes during operation of the power production process. Controlling this function can be effective to cause the flame generated in a combustion zone 221 of the combustor 220 by the combustion of the variable fuel 207a blended with the diluent 283b can be substantially unchanged regardless of the actual chemistry of the variable fuel that is utilized for combustion. In some embodiments, the control function imparted by blending the diluent with the variable fuel can be based upon any one or more of the following:

The dilution ratio of the diluent blended with the variable fuel prior to combustion: The dilution ratio can vary based upon the actual heating value of the variable fuel at the time of dilution. For example, when the chemistry of the variable fuel provides a relatively low heating value, the dilution ratio (i.e., the amount of diluent added) can be low, and when the chemistry of the variable fuel provides a relatively high heating value, the dilution ratio can be higher. In this manner, an average heating value can be achieved. In some embodiments, the ratio of diluent to variable fuel can be about 0.1 to about 2, about 0.5 to about 1.5, or about 0.8 to about 1.2.

The temperature of the diluent when added to the variable fuel: The temperature of the diluent can be used, for example, to control the flame temperature in the combustor. For example, when the chemistry of the variable fuel provides a relatively low heating value, the diluent can be provided at a higher temperature so as not to artificially lower flame temperature. When the chemistry of the variable fuel provides a relatively high heating value, however, the temperature of the diluent can be lower so that the flame temperature does not exceed a desired range. The temperature of the diluent when added to the variable fuel can be effective to change the overall temperature of the variable fuel, which temperature itself can be a control function.

The flow rate of the diluent when added to the variable fuel: The addition of diluent to the variable fuel can facilitate a wide variety of changes to the variable fuel. For example, the heating value of the variable fuel can be modified as discussed above. Further, volumetric and mass flow rates can impact the total amount of the variable fuel that is needed (i.e., as a function of mass and heating value). Such flow rates likewise can impact the pressure drop through the injection nozzle as well as the fuel and jet speed through the nozzle. The addition flow rate for the diluent further can affect the peak flame temperature, which can impact the nature of any impurities that are formed (e.g., NOx and/or SOx), the extent of CO burnout that occurs, and the $CO_2$ dissociation rate.

In one or more embodiments, variations in combustion properties caused by the varying chemistries of the variable fuel 207a being input to the combustor 220 can be normalized by controlling the oxidant 203 being input to the combustor. Preferably, the oxidant is a mixture of oxygen and a diluent (e.g., an inert gas, carbon dioxide, or water). As illustrated in FIG. 2, a substantially pure stream of oxygen 203 is blended with a stream of substantially pure carbon dioxide 283a for input to the combustor 220. In some embodiments, the oxidant stream entering the combustor 220 can include about 5% to about 95% by mass oxygen, about 5% to about 75% by mass oxygen, about 5% to about 50% by mass oxygen, about 10% to about 40% by mass oxygen, or about 15% to about 30% by mass oxygen, with the remaining portion of the oxidant being the diluent. In particular exemplary embodiments, the mixture can be about 20% by mass $O_2$ and about 80% by mass $CO_2$. In some cases, the diluent content in the oxidant can be a tuning parameter for any one or more of combustion mass control, flame shape control, and flame temperature control. Diluent (e.g., $CO_2$) in some embodiments can be provided in both the fuel stream and the oxidant stream. As such either stream (or both streams) can function as a moderator to ensure a moderate flame temperature for low NOx generation. In such combustion embodiments, about 1-2% molar excess oxygen can be provided into the combustor to ensure complete fuel burnout. In some embodiments, combustion thus can be normalized by implementing a control function that can include varying a ratio of the oxygen to the carbon dioxide in the oxidant as the composition of the variable fuel varies during operation of the power production process.

Normalizing combustion as the fuel chemistry of the variable fuel changes during operation of the power production process can be achieved in further embodiments by adjusting further parameters related to the fuel and oxidant. In some embodiments, a control function for controlling combustion properties can include varying the temperature of the oxidant that is input to the combustor. Accordingly, as the fuel chemistry changes, the oxidant temperature may be adjusted to maintain one or more combustion properties within a defined, acceptable range. In some embodiments, a control function for controlling combustion properties can include varying the temperature of the variable fuel that is input to the combustor. Accordingly, as the fuel chemistry changes, the fuel temperature may be adjusted to maintain one or more combustion properties within a defined, acceptable range. In some embodiments, a control function for controlling combustion properties can include varying the flow rate of the oxidant that is input to the combustor. Accordingly, as the fuel chemistry changes, the oxidant flow rate may be adjusted to maintain one or more combustion properties within a defined, acceptable range. In some embodiments, a control function for controlling combustion properties can include varying the flow rate of the variable fuel that is input to the combustor. Accordingly, as the fuel chemistry changes, the fuel flow rate may be adjusted to maintain one or more combustion properties within a defined, acceptable range.

In one or more embodiments, the varying chemistries of the variable fuel 207a being input to the combustor 220 can be normalized by being blended with a further fuel of known, substantially consistent chemistry. The fuel of known, substantially constant or consistent chemistry can be characterized as a "normalizing fuel" in that it can be blended with the variable fuel in a sufficient ratio to dilute the effects of changes in the chemistry of the variable fuel during operation of the power production process. For example, the normalizing fuel 207b can be blended with the variable fuel 207a at some point upstream from the injection of the fuel(s) into the combustor 220. The blend ratio, the temperature of the normalizing fuel, and similar properties as already discussed herein can be utilized so that the normalizing fuel 207b can be controlled as a normalizing function that can be adjusted in one or more manners as the fuel chemistry of the variable fuel 207a changes during operation of the power production process. Controlling this function can be effective to cause the flame generated in the combustion zone 221 of the combustor 220 by the combustion of the combined fuel (variable fuel 207a and normalizing fuel 207b) can be substantially unchanged regardless of the actual chemistry of the variable fuel that is utilized for combustion. In some embodiments, the normalizing fuel can be natural gas or substantially pure methane. In other embodiments, the normalizing fuel may be carbon monoxide, hydrogen, or a syngas composition of substantially constant or consistent chemistry. The normalizing fuel preferably will have a known heating value so that the ratio of the normalizing fuel to the variable fuel can be varied during operation of the power production process as the fuel chemistry of the variable fuel changes and thus maintain substantially constant combustion properties. In some embodiments, the ratio of normalizing fuel to variable fuel can be about 0.1 to about 2, about 0.5 to about 1.5, or about 0.8 to about 1.2.

While normalizing of combustion may be achieved through one or more of the control functions described above, it is further possible to control the power production process downstream of combustion. In some embodiment, this can be achieved within the combustor 220. For example, the combustor 220 can be configured to include a combustion zone 221 where the fuel and oxidant mix and the fuel is combusted and a dilution zone 222 where the combustion product may undergo one or more changes prior to exiting the combustor. As illustrated in FIG. 2, the combustion zone 221 is upstream of the dilution zone 222, and the dilution zone is downstream of the combustion zone. A diluent 283c can be injected into the combustor 220 in the dilution zone 222 to normalize one or more properties related to combustion. For example, the amount of diluent 283c can vary as the fuel chemistry of the variable fuel 207a changes during operation of the power production process to provide cooling to the combustion exhaust as needed to maintain consistent combustion properties. The amount of diluent 283c that is added may also vary as the flow rates of one or more of the variable fuel 207a, the oxidant 203, and the normalizing fuel 207b (when applicable) changes. Thus, the diluent 283c input to the dilution zone 222 can be used to make up for fluctuations in flow rates of one or more further streams as a means for normalizing combustion.

In some embodiments, the input of a diluent into the dilution zone 222 of the combustor 220 can be used as a control function for normalization of combustion in a power production process in relation to a variety of actions. In exemplary embodiments, it can be useful to control a mass flow rate of the diluent injected into the combustor in the dilution zone to be greater than a mass flow rate of the variable fuel provided to the combustor. In further exemplary embodiments, it can be useful to control a mass flow rate of the diluent injected into the combustor in the dilution zone to be greater than a mass flow rate of the oxidant provided to the combustor. In other exemplary embodiments, it can be useful to control a mass flow rate of the diluent injected into the combustor in the dilution zone to be greater than a mass flow rate of both of the variable fuel provided to the combustor and the oxidant provided to the combustor. In still further exemplary embodiments, it can be useful to vary a temperature of the diluent injected into the combustor in the dilution zone as the composition of the variable fuel varies during operation of the power production process. The mass flow rate of the diluent injected into the dilution zone of the combustor may remain substantially constant as the temperature is changed to make the necessary adjustment based on the change in the fuel chemistry; however, the diluent flow rate into the dilution chamber may vary in combination with a change in the temperature of the diluent. In preferred embodiments, the diluent 283c can be substantially pure carbon dioxide. In further embodiments, however, different diluents or combinations of diluents may be used. In some embodiments, the amount of diluent to be added to the dilution zone can depend upon the length of the dilution zone relative to the length of the combustion zone. For example, a ratio of the length of the combustion zone to a length of the dilution zone can be about 0.25 to 1.5.

The ability to maintain a substantially constant combustor output across a variety of fuel chemistries can be important in that it allows for the use of a single turbine in the power production system. Typically, changes in fuel chemistry can require changes to the turbine because of the differing characteristics of the combustor output based upon the fuel chemistry. As such, a power production plant must utilize multiple turbines (and typically multiple combustors) to accommodate different fuel chemistries. Alternatively, a power production plant with a single combustor and/or single turbine can be limited to combustion of only a single fuel chemistry that will leave little room for chemistry fluctuations. Because of the ability according to the present disclosure to provide a substantially constant combustor output across a variety of different fuel chemistries, it is possible to carry out the power production methods with a power production system including only a single turbine (and a single combustor). Accordingly, the present methods advantageously can normalize combustion properties across a spectrum of fuel chemistries so that a power production system and method designed to function under a defined set of operating parameters can successfully function within the parameter set despite the use of differing fuel chemistries that would otherwise be expected to cause operating conditions to exceed one or more of the predefined operating parameters. This can be particularly advantageous in that power production can be achieved using differing fuel chemistries even with systems and methods that typically have relatively narrow ranges of allowable operating parameters, such as a semi-closed loop $CO_2$ cycle. Perturbations in combustion characteristics and flame across these mixtures can be mitigated since performance of each individual fuel mixture composition can be made substantially identical through implementation of one or more of the control parameters.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for normalizing combustion in a power production process, the method comprising:
   inputting to a combustor each of:
   a) a modified heating value fuel that is a mixture of carbon dioxide and a variable fuel that is subject to compositional changes during the power production process;
   b) a mixture of carbon dioxide and an oxidant; and
   c) a diluent comprising additional carbon dioxide;
   operating the combustor so that the variable fuel in the modified heating value fuel is combusted with the oxidant in the mixture of the carbon dioxide and the oxidant to provide a combustor exhaust stream;
   passing the combustor exhaust stream through a turbine to generate power; and
   implementing, in response to receiving one or more inputs indicative of a compositional change to the variable fuel, at least one control function effective to account for the compositional change to the variable fuel so that combustion is normalized, said at least one control function comprising varying a flow rate into the combustor of one or more of the modified heating value fuel, the mixture of the carbon dioxide and the oxidant, and the diluent and varying a temperature of one or both of the mixture of the carbon dioxide and the oxidant, and the diluent;
   wherein normalization of combustion is defined in that one or more of fuel heating value, combustion pressure, mass flow out of the combustor, turbine inlet flow chemistry, and turbine speed varies from a predetermined value by no greater than 10%.

2. The method of claim 1, wherein the combustor comprises a combustion zone and a dilution zone that is downstream from the combustion zone.

3. The method of claim 2, wherein at least a portion of the diluent is input to the dilution zone.

4. The method of claim 1, wherein the at least one control function further comprises varying a ratio of the carbon dioxide that is mixed with the variable fuel to form the modified heating value fuel.

5. The method of claim 4, wherein the at least one control function further comprises varying a temperature of the modified heating value fuel.

6. The method of claim 4, wherein the at least one control function further comprises varying a ratio of the carbon dioxide that is mixed with the oxidant.

7. The method of claim 6, wherein the at least one control function further comprises varying a chemistry of the diluent by mixing one or more additional diluents with the carbon dioxide.

8. The method of claim 1, wherein the variable fuel is a syngas, and wherein a ratio of carbon monoxide to hydrogen in the syngas varies during operation of the power production process.

9. The method of claim 1, wherein the variable fuel is a mixture of methane, carbon monoxide, and hydrogen, and a ratio between the methane, carbon monoxide, and hydrogen varies during operation of the power production process.

10. The method of claim 1, wherein the mixture of the carbon dioxide and the oxidant includes 5% to 50% by mass oxygen, with the balance of the mixture being the carbon dioxide.

11. The method of claim 1, wherein the mixture of the carbon dioxide and the oxidant includes 15% to 30% by mass oxygen, with the balance of the mixture being the carbon dioxide.

12. The method of claim 1, wherein the modified heating value fuel further includes a normalizing fuel having a substantially constant composition.

13. The method of claim 12, wherein the normalizing fuel is natural gas or substantially pure methane.

14. The method of claim 12, wherein the at least one control function further comprises varying a ratio of the normalizing fuel to the variable fuel in the modified heating value fuel.

15. A method for normalizing combustion in a power production process, the method comprising:
   inputting to a combustor each of:
   a) a modified heating value fuel that is a mixture of carbon dioxide and a variable fuel that is subject to compositional changes during the power production process;
   b) a mixture of carbon dioxide and an oxidant; and
   c) a diluent comprising additional carbon dioxide;
   operating the combustor so that the variable fuel in the modified heating value fuel is combusted with the oxidant in the mixture of the carbon dioxide and the oxidant to provide a combustor exhaust stream;
   passing the combustor exhaust stream through a turbine to generate power; and
   implementing, in response to receiving one or more inputs indicative of a compositional change to the variable fuel, at least one control function effective to account for the compositional change to the variable fuel so that combustion is normalized, said at least one control function comprising varying a ratio of the carbon dioxide that is mixed with the variable fuel to form the modified heating value fuel and varying a temperature of one or both of the mixture of the carbon dioxide and the oxidant, and the diluent;
   wherein normalization of combustion is defined in that one or more of fuel heating value, combustion pressure, mass flow out of the combustor, turbine inlet flow chemistry, and turbine speed varies from a predetermined value by no greater than 10%.

16. The method of claim 15, wherein the at least one control function further comprises one or more of:
   varying a flow rate into the combustor of one or more of the modified heating value fuel, the mixture of the carbon dioxide and the oxidant, and the diluent;
   varying a temperature of one or more of the modified heating value fuel;
   varying a ratio of the carbon dioxide that is mixed with the oxidant; and
   varying a chemistry of the diluent by mixing one or more additional diluents with the carbon dioxide.

17. A method for normalizing combustion in a power production process, the method comprising:
   inputting to a combustor each of:
   a) a modified heating value fuel that is a mixture of carbon dioxide and a variable fuel that is subject to compositional changes during the power production process;
   b) a mixture of carbon dioxide and an oxidant; and
   c) a diluent comprising additional carbon dioxide;
   operating the combustor so that the variable fuel in the modified heating value fuel is combusted with the oxidant in the mixture of the carbon dioxide and the oxidant to provide a combustor exhaust stream;

passing the combustor exhaust stream through a turbine to generate power; and implementing, in response to receiving one or more inputs indicative of a compositional change to the variable fuel, at least one control function effective to account for the compositional change to the variable fuel so that combustion is normalized, said at least one control function comprising varying a temperature of one or both of the mixture of the carbon dioxide and the oxidant, and the diluent;

wherein normalization of combustion is defined in that one or more of fuel heating value, combustion pressure, mass flow out of the combustor, turbine inlet flow chemistry, and turbine speed varies from a predetermined value by no greater than 10%.

18. The method of claim 17, wherein the at least one control function further comprises one or more of:

varying a flow rate into the combustor of one or more of the modified heating value fuel, the mixture of the carbon dioxide and the oxidant, and the diluent;

varying a ratio of the carbon dioxide that is mixed with the variable fuel to form the modified heating value fuel;

varying a ratio of the carbon dioxide that is mixed with the oxidant; and varying a chemistry of the diluent by mixing one or more additional diluents with the carbon dioxide.

19. A method for normalizing combustion in a power production process, the method comprising:

inputting to a combustor each of:
 a) a modified heating value fuel that is a mixture of carbon dioxide and a variable fuel that is subject to compositional changes during the power production process;
 b) a mixture of carbon dioxide and an oxidant; and
 c) a diluent comprising additional carbon dioxide;

operating the combustor so that the variable fuel in the modified heating value fuel is combusted with the oxidant in the mixture of the carbon dioxide and the oxidant to provide a combustor exhaust stream;

passing the combustor exhaust stream through a turbine to generate power; and implementing, in response to receiving one or more inputs indicative of a compositional change to the variable fuel, at least one control function effective to account for the compositional change to the variable fuel so that combustion is normalized, said at least one control function comprising varying a ratio of the carbon dioxide that is mixed with the oxidant and varying a temperature of one or both of the mixture of the carbon dioxide and the oxidant, and the diluent;

wherein normalization of combustion is defined in that one or more of fuel heating value, combustion pressure, mass flow out of the combustor, turbine inlet flow chemistry, and turbine speed varies from a predetermined value by no greater than 10%.

20. The method of claim 19, wherein the at least one control function further comprises one or more of:

varying a flow rate into the combustor of one or more of the modified heating value fuel, the mixture of the carbon dioxide and the oxidant, and the diluent;

varying a ratio of the carbon dioxide that is mixed with the variable fuel to form the modified heating value fuel;

varying a temperature of one or more of the modified heating value fuel, the mixture of the carbon dioxide and the oxidant, and the diluent; and varying a chemistry of the diluent by mixing one or more additional diluents with the carbon dioxide.

* * * * *

UNITED STATES PATENT AND TRADEMARK OFFICE
CERTIFICATE OF CORRECTION

PATENT NO. : 12,259,136 B2
APPLICATION NO. : 18/231384
DATED : March 25, 2025
INVENTOR(S) : Xijia Lu et al.

Page 1 of 1

It is certified that error appears in the above-identified patent and that said Letters Patent is hereby corrected as shown below:

In the Specification

In Column 4, Line 62, delete "disclosure" and insert -- disclosure. --.

In Column 8, Line 45, delete "process" and insert -- process. --.

In the Claims

In Column 14, Line 49, in Claim 16, delete "of one or more of" and insert -- of --.

Signed and Sealed this
Tenth Day of June, 2025

Coke Morgan Stewart
*Acting Director of the United States Patent and Trademark Office*